(12) United States Patent
Lee et al.

(10) Patent No.: US 11,042,234 B2
(45) Date of Patent: Jun. 22, 2021

(54) TOUCH DISPLAY INCLUDING ELECTROSTATIC DISCHARGE PROTECTION AND ELECTRONIC DEVICE COMPRISING SAME

(71) Applicant: Samsung Electronics Co., Ltd., Suwon-si (KR)

(72) Inventors: Dong-Seop Lee, Seoul (KR); Jong-Hun An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/343,671

(22) PCT Filed: Oct. 19, 2017

(86) PCT No.: PCT/KR2017/011608
§ 371 (c)(1),
(2) Date: Apr. 19, 2019

(87) PCT Pub. No.: WO2018/074867
PCT Pub. Date: Apr. 26, 2018

(65) Prior Publication Data
US 2020/0057521 A1 Feb. 20, 2020

(30) Foreign Application Priority Data

Oct. 20, 2016 (KR) .................. 10-2016-0136399

(51) Int. Cl.
*G06F 3/041* (2006.01)
*G02F 1/1335* (2006.01)
*G02F 1/1333* (2006.01)

(52) U.S. Cl.
CPC ........ *G06F 3/0412* (2013.01); *G02F 1/13338* (2013.01); *G02F 1/133512* (2013.01);
(Continued)

(58) Field of Classification Search
CPC .......... G02F 2202/28; G02F 2201/121; G02F 1/1335; G02F 1/1333; G02F 2202/22; G02F 2001/134318; G06F 3/041
See application file for complete search history.

(56) References Cited

U.S. PATENT DOCUMENTS

| 8,692,788 | B2 * | 4/2014 | Cho | ............. | G06F 3/0412 |
| | | | | | 345/173 |
| 2002/0047661 | A1 * | 4/2002 | Yamazaki | ............. | H01J 29/085 |
| | | | | | 315/366 |

(Continued)

FOREIGN PATENT DOCUMENTS

| CN | 105652545 A | | 6/2016 | | |
| KR | 10-2007-0073314 | * | 1/2009 | ........... | G02F 1/1335 |

(Continued)

OTHER PUBLICATIONS

European Search Report dated Aug. 14, 2019, issued in the European Application No. 17862275.9.
(Continued)

*Primary Examiner* — Benyam Ketema
(74) *Attorney, Agent, or Firm* — Jefferson IP Law, LLP

(57) ABSTRACT

Various embodiments may provide an electronic device comprising a touch display, wherein the touch display comprises: a substrate; a plurality of common electrodes arranged at predetermined intervals on the substrate and used for both liquid crystal alignment and touch wiring; a liquid crystal layer disposed on the common electrodes; and a color filter disposed on the liquid crystal layer and including a plurality of unit pixels arranged at predetermined intervals by using a low-resistance black matrix (BM) layer disposed on the rear surface thereof, wherein the BM layer is formed of a low-resistance material, and at least a partial region of the BM layer is electrically connected to the ground of the substrate.

20 Claims, 7 Drawing Sheets

(52) U.S. Cl.
CPC .. *G02F 1/133514* (2013.01); *G02F 2201/121* (2013.01); *G02F 2202/28* (2013.01)

(56) References Cited

U.S. PATENT DOCUMENTS

| | | | | |
|---|---|---|---|---|
| 2011/0088770 | A1* | 4/2011 | Allemand | H05K 3/245 |
| | | | | 136/256 |
| 2011/0285640 | A1* | 11/2011 | Park | G02F 1/13338 |
| | | | | 345/173 |
| 2012/0133858 | A1 | 5/2012 | Shin et al. | |
| 2012/0146922 | A1* | 6/2012 | Kang | G06F 3/0443 |
| | | | | 345/173 |
| 2013/0050126 | A1* | 2/2013 | Kimura | G06F 3/0412 |
| | | | | 345/173 |
| 2014/0118639 | A1 | 5/2014 | Matsushima | |
| 2014/0338735 | A1* | 11/2014 | Allemand | H05K 3/249 |
| | | | | 136/255 |
| 2014/0368749 | A1* | 12/2014 | Alonso | G02F 1/133514 |
| | | | | 349/12 |
| 2015/0253468 | A1 | 9/2015 | Zuo et al. | |
| 2016/0018707 | A1 | 1/2016 | Kang et al. | |
| 2016/0124280 | A1* | 5/2016 | Park | G02F 1/13394 |
| | | | | 349/43 |
| 2016/0357278 | A1* | 12/2016 | Qu | G02F 1/133512 |
| 2018/0107337 | A1* | 4/2018 | Sun | G06F 3/044 |
| 2018/0188571 | A1* | 7/2018 | Wang | G02F 1/133516 |
| 2019/0094605 | A1* | 3/2019 | Wang | G02F 1/136286 |

FOREIGN PATENT DOCUMENTS

| | | | | |
|---|---|---|---|---|
| KR | 10-2009-0010318 | * | 1/2009 | |
| KR | 10-1298610 B1 | | 8/2013 | |
| KR | 10-20080040505 | * | 8/2013 | G02F 1/136 |
| KR | 10-2007-0073314 | * | 3/2014 | G02F 1/1335 |
| KR | 10-1373500 B1 | | 3/2014 | |
| KR | 10-1382837 B1 | | 4/2014 | |
| KR | 10-2016-0002565 | * | 6/2014 | G06F 3/041 |
| KR | 10-2015-0033158 A | | 4/2015 | |
| KR | 10-2016-0002565 A | | 1/2016 | |

OTHER PUBLICATIONS

Indian Office Action dated Jan. 7, 2021, issued in Indian Application No. 201927017653.

European Office Action dated Apr. 14, 2021, issued in European Application No. 17862275.9.

* cited by examiner ized and lighter in weight, the degree of circuit integration is increasing and the spacing between components is being reduced, and thus a countermeasure against ESD introduced from the outside is required.

TOUCH DISPLAY INCLUDING ELECTROSTATIC DISCHARGE PROTECTION AND ELECTRONIC DEVICE COMPRISING SAME

TECHNICAL FIELD

Various embodiments of the disclosure relate to a touch display including electrostatic discharge (ESD) protection and an electronic device including the touch display.

BACKGROUND ART

An electronic device may include at least one display used as data output means. According to an embodiment, the electronic device may include a touch display including a touch sensor used for data input/output.

In particular, in electronic devices (e.g., smart phones) that are getting smaller and lighter in weight, the degree of circuit integration is increasing and the spacing between components is being reduced, and thus a countermeasure against ESD introduced from the outside is required.

DISCLOSURE OF INVENTION

Technical Problem

Electronic devices, which are getting smaller and lighter in weight and include a touch display, may include a structure for effectively discharging (grounding) static electricity introduced from the outside thereof. For example, a structure in which a touch sensor is stacked on an upper portion of a liquid crystal layer (e.g., on the upper face of a color filter or on the rear face of window glass) includes a conductive pattern (e.g., an indium tin oxide (ITO) pattern) may be used as a shield member for ESD protection.

However, in the case in which a touch sensor is also used as a component of a display, for example, in the case of a touch display (e.g., an in-cell type touch display) in which an electrode disposed on a TFT substrate for driving a liquid crystal layer is used as an electrode for touch sensing), when a separate conductive shield member is provided on the upper portion of the touch sensor for ESD protection, the touch performance is significantly lowered, and thus the conductive shield member is inevitably excluded, which may cause the touch display to be vulnerable to external noise.

In order to solve such a problem, a method of applying a low-resistance coating film to the surface of a color filter and electrically connecting the low-resistance coating film to a ground is used, but there may be problems such as uniformity of application of the coating film or occurrence of additional steps.

Various embodiments of the disclosure provide a touch display including electrostatic discharge protection and an electronic device including the touch display.

Various embodiments of the disclosure provide a touch display including electrostatic discharge protection that is capable of inducing a smooth operation of a touch sensor and performing effective electrostatic discharge, and an electronic device including the touch display.

Solution to Problem

According to various embodiments, an electronic device may include a touch display. The touch display may include a substrate, a plurality of common electrodes disposed on the substrate at predetermined intervals and used for arrangement of liquid crystals and for touch wiring, a liquid crystal layer disposed above the common electrodes, and a color filter disposed above the liquid layer and including a plurality of unit pixels arranged at predetermined intervals via a low-resistance black matrix (BM) layer disposed on a rear face. The BM layer may be formed of a low-resistance material, and at least a partial region of the BM layer is electrically connected to a ground of the substrate.

According to various embodiments of the disclosure, an electronic device may include a housing including a first face oriented in a first direction, and a second face oriented in a second direction opposite the first direction, a window on at least a part of the first face of the housing, and a touch display disposed between the window and the second face. The touch display may include a substrate, a plurality of common electrodes disposed on the substrate at predetermined intervals and used for arrangement of liquid crystals and for touch wiring, a liquid crystal layer disposed above the common electrodes, a color filter disposed above the liquid layer and including a plurality of unit pixels arranged at predetermined intervals via a low-resistance black matrix (BM) layer disposed on a rear face, a polarizing plate stacked above the color filter via a low-resistance adhesive member, and a conductive connection member disposed to electrically connect at least a partial region of the BM layer and at least a partial region of the low-resistance adhesive member to the ground of the substrate.

Advantageous Effects of Invention

According to various embodiments, an electrostatic discharge measure is effectively provided using the existing display components without adding an additional shield member. Thus, the slimming of the electronic device and the operational stability of the touch display can be realized.

BEST MODE FOR CARRYING OUT THE INVENTION

Figure 1:
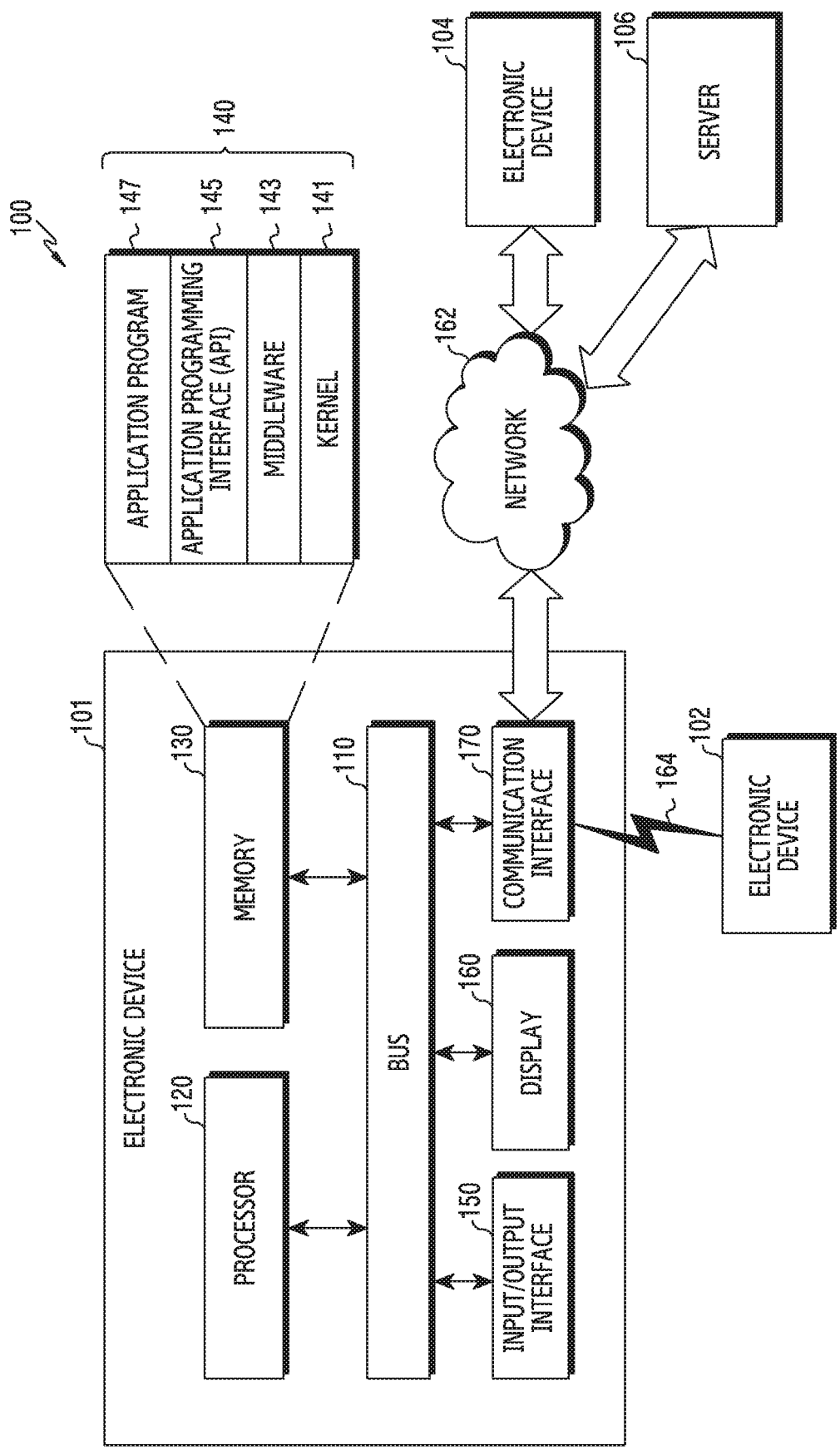
FIG. 1 is a view illustrating a network environment that includes an electronic device according to various embodiments of the disclosure.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", or "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.). According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element. The bus 110 may, for example, include a circuit coupling the constituent elements 110, 120, 150, 160 and 170 with one another and forwarding communication (e.g., a control message or data) between the constituent elements. The processor 120 may include one or more of a central processing unit (CPU), an application processor (AP) or a communication processor (CP). The processor 120 may, for example, execute operation or data processing for control and/or communication of at least one another constituent element of the electronic device 101.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests. The API 145 is, for example, an interface enabling the application program 147 to control a function provided by the kernel 141 or the middleware 143 and may, for example, include at least one interface or function (e.g., an instruction) for file control, window control, image processing, character control or the like. The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body. The communication interface 170 may, for example, establish communication between the electronic device 101 and an external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like. The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, in case where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example. The power managing unit 180 may control charging the battery 190. According to an embodiment, the power managing unit 180 may include a power management integrated circuit (PMIC) and a charger integrated circuit (IC). For example, the power managing unit 180 may step up or step down power, which is supplied to the battery 190, to a predetermined level voltage.

Figure 2:
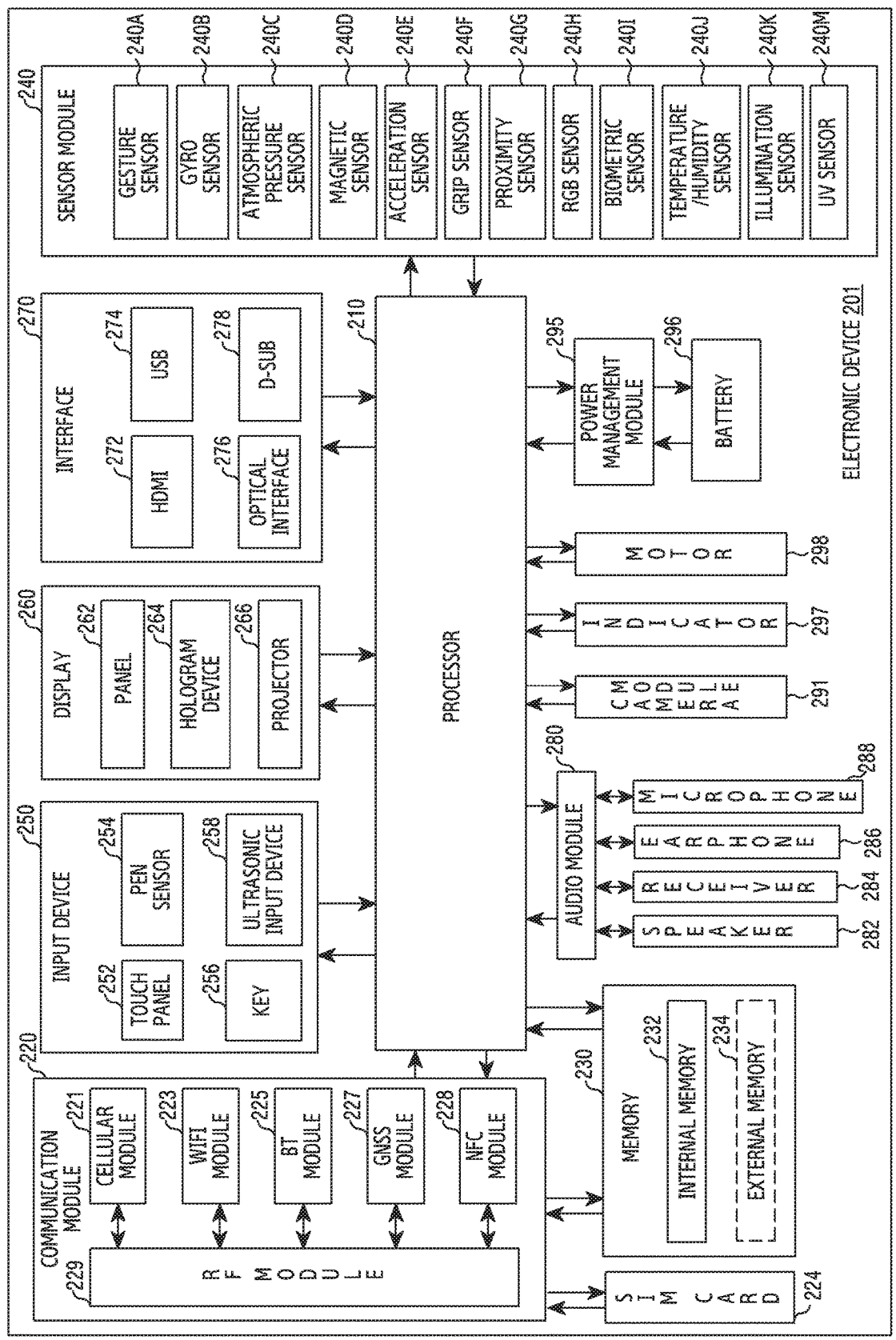
FIG. 2 is a block diagram of an electronic device according to various embodiments of the disclosure.

FIG. 2 is a block diagram illustrating an electronic device according to various embodiments of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298. The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a WiFi module 223, a Bluetooth module 225, a GNSS module 227, an near field communication (NFC) module 228, and a radio frequency (RF) module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module. The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature/humidity sensor 240J, an illuminance sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

According to various embodiments, in case that the display is a liquid crystal-driven TFT display, a touch panel may include an in-cell type touch display used also as an electrode for driving a liquid crystal of the TFT.

According to the various embodiment, the pen sensor (254) may include EMR (electromagnetic resonance) sensor for detecting an input of a detachably mounted electronic pen. According to one embodiment, the processor may detect an input position by receiving a feedback signal with respect to a resonance frequency according to vibration of a coil included in the electronic pen, using an electromagnetic field generated by the EMR sensor. According to one embodiment, the processor may include a control circuit (driver IC) disposed on the EMRS sensor.

The display 260 (e.g., the display 160) may include a panel 262, a hologram device 264, a projector 266, and/or a control circuit for controlling them. The panel 262 may, for example, be implemented to be flexible, transparent, or wearable. The panel 262 may be constructed as one or more modules together with the touch panel 252. The hologram device 264 may show a three-dimensional image to the air using an interference of light. The projector 266 may project light onto a screen, to display an image. The screen may, for example, be located inside or outside the electronic device 201. The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like. The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like). The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
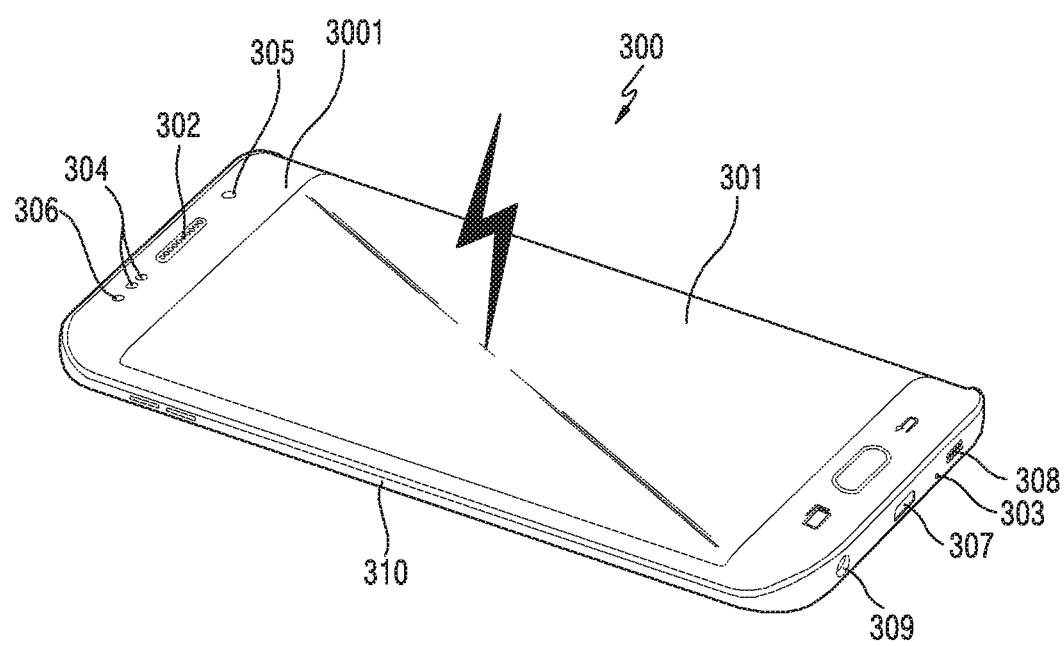
FIG. 3 is a perspective view illustrating an electronic device according to various embodiments of the disclosure.

FIG. 3 is a perspective view illustrating an electronic device 300 according to various embodiments of the disclosure.

Referring to FIG. 3, a display 301 may be provided on a front face 3001 (e.g., a first face) of the electronic device 300. A speaker device 302 may be installed on one side of the display 301 so as to output a voice received from a counterpart. A microphone device 303 may be installed on the other side of the display 301 so as to transmit a voice of the user of the electronic device to the counterpart. According to an embodiment, the display 301 may include a touch screen device that includes a touch sensor. According to an embodiment, the display 301 may include a touch display that includes a touch sensor (a contact-type touch sensor or a non-contact-type touch sensor (digitizer)). According to an embodiment, the display 301 may include a pressure sensor (force sensor) so as to detect an external force applied to the face of the display 301. According to an embodiment, the electronic device 300 may conduct a corresponding function based on the external force detected on the display 301.

According to various embodiments, the electronic device 300 may include components, which may be disposed around the speaker device 302 in the electronic device 300 to conduct various functions of the electronic device 300. According to an embodiment, the components may include at least one sensor module 304. The sensor modules 304 may include at least one of, for example, an illuminance sensor (e.g., an optical sensor), a proximity sensor, an infrared sensor, an ultrasonic sensor, an iris recognition sensor, and a face recognition sensor. According to an embodiment, the components may include a camera device 305. According to an embodiment, the components may include an indicator 306 (e.g., an LED indicator) configured to allow a user to recognize status information of the electronic device 300.

According to various embodiments, an interface connector port 307 for accommodating an external interface connector (e.g., a B-type USB connector, a C-type USB connector, etc.) and an ear jack hole 309 for accommodating an ear jack may be included on one side of the microphone device 303. According to an embodiment, another speaker device 308 may be disposed on the other side of the microphone device 303.

According to various embodiments, the electronic device 300 may include a housing 310 made of a metal material (e.g., a metal bezel) for reinforcing rigidity. According to an embodiment, at least a part of the housing 310 may be disposed along the peripheral edge of the electronic device 300, and may be disposed to expand to at least a partial region of the rear face (e.g., a second face) of the electronic device 300 that extends from the peripheral edge. According to an embodiment, the housing 310 may be defined as the thickness of the side face of the electronic device along the peripheral edge of the electronic device 300, and may be formed in a loop shape (e.g., partially open or fully closed loop shape). Without being limited thereto, however, the housing 310 may be formed in at least a portion of the thickness of the electronic device 300. According to an embodiment, the housing 310 may only be disposed in at least a partial region of the peripheral edge of the electronic device 300. According to an embodiment, the housing disposed on the peripheral edge of the electronic device 300 may include a conductive member to be used as an antenna radiator.

According to various embodiments, the display 301 may be implemented as a touch display. According to an embodiment, the display 301 may include an in-cell-type touch display in which an electrode for liquid crystal driving is also used as an electrode for touch sensing. According to an embodiment, in the in-cell-type touch display 301, a BM region made of a low-resistance material may be utilized in order to effectively ground static electricity generated from the outside of the electronic device 300. According to an embodiment, static electricity introduced into the touch display 301 may be grounded to the ground of a substrate (e.g., a TFT substrate) through the BM region of made of a low-resistance material. Therefore, even if the display 301 does not include a separate shield member for discharging external static electricity, an effective protection measure may be provided, so that slimming of the electronic device can be realized.

Figure 4:
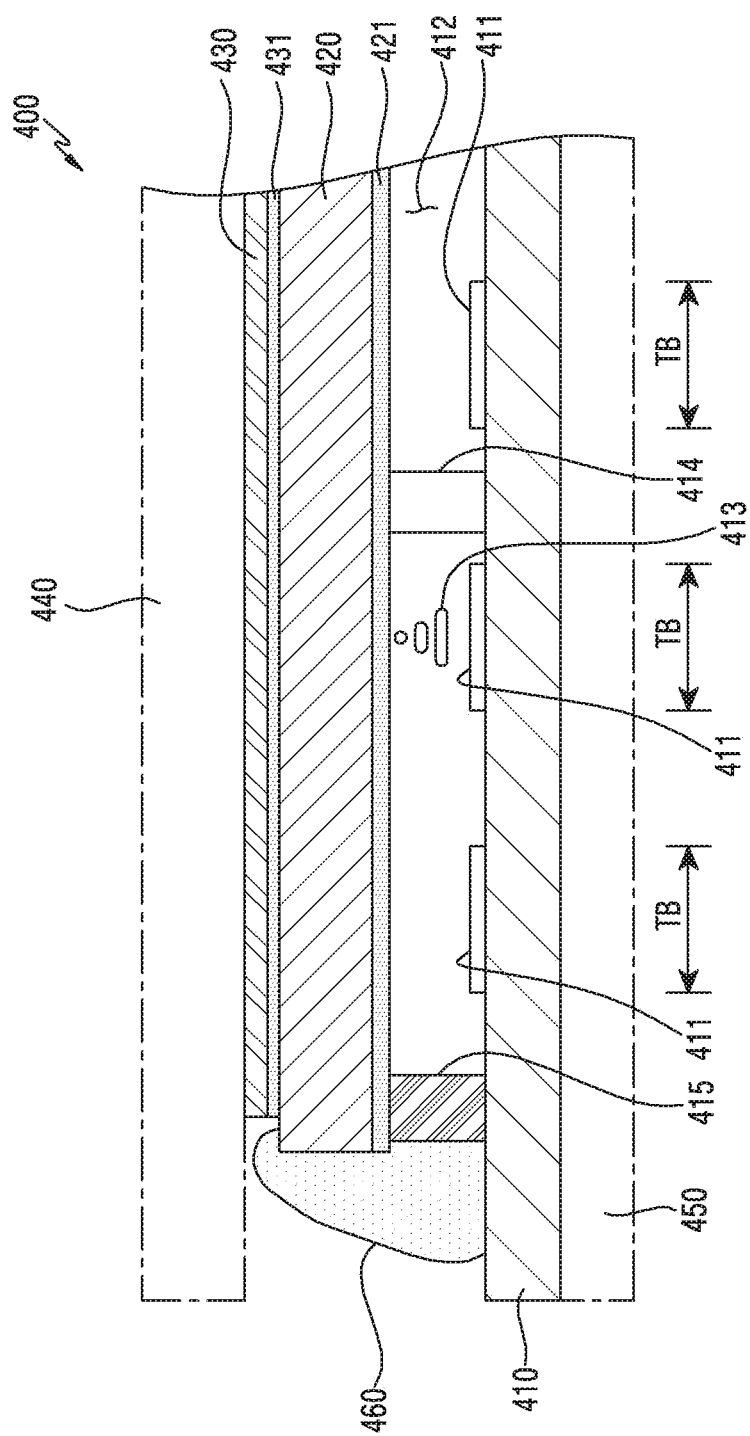
FIG. 4 is a cross-sectional view illustrating the configuration of a touch display according to various embodiments of the disclosure.

FIG. 4 is a cross-sectional view illustrating the configuration of a touch display according to various embodiments of the disclosure.

The touch display 400 of FIG. 4 may be similar to the display 301 of FIG. 3 or may include another embodiment of the display.

Referring to FIG. 4, the touch display 400 includes a first layer 410, a second layer 420 disposed above the first layer 410, a third layer 430 disposed above the second layer 420, and a fourth layer 450 disposed below the first layer 410.

According to various embodiments, the first layer 410 may include a substrate. According to an embodiment, the first layer 410 may remain spaced apart from the second layer 420 by at least one spacer 414 interposed between the first layer 410 and the second layer 420. According to an embodiment, liquid crystals 413 may be applied to the space 412 between the first layer 410 and the second layer 420. According to an embodiment, a sealant 415 may be disposed at an end portion to interrupt the liquid crystal held in the space 412 between the first layer 410 and the second layer 420. According to an embodiment, the first layer 410 may include a plurality of circuit units for switching applied power in order to define the arrangement of liquid crystals 413. According to an embodiment, the plurality of circuit units may include thin film transistors (TFTs). According to an embodiment, the first layer 410 may include a plurality of common electrodes 411. According to an embodiment, the common electrodes 411 may be arranged in a block form so as to include a predetermined number of main pixel regions (P in FIG. 5), and may also be used as electrodes (an electrode layer) for touch sensing.

According to various embodiments, the second layer 420 may include a color filter for transmitting light emitted through the liquid crystals 413 as a desired color. According to an embodiment, the color filter may include a black matrix (BM) layer 421 disposed on the rear side. According to an embodiment, the BM layer 421 may include a first sub-pixel region (Pr in FIG. 5), a second sub-pixel region (Pg in FIG. 5), and a third sub-pixel region (Pb in FIG. 5), which correspond to each of a plurality of pixels (P in FIG. 5), which are arranged to be spaced apart from each other at predetermined intervals.

According to various embodiments, the third layer 430 may include an upper polarizing plate that selectively transmits only components in a particular orientation of light. According to an embodiment, the upper polarizing plate may be stacked on the color filter 420 through a predetermined adhesive member 431 (OCA and/or PSA).

According to various embodiments, the fourth layer 450 may include a backlight unit (BLU) to provide light to the liquid crystal. Although not illustrated, a lower polarizing plate may be further disposed between the backlight layer and the substrate to selectively transmit the light emitted from the backlight layer.

According to various embodiments, a window 440 may be disposed above the third layer 430. According to an embodiment, the window 440 may be formed of glass or a transparent synthetic resin material, and may be exposed to the outside of the electronic device to protect the display and receive a touch input of an external object.

According to various embodiments, the touch display 400 may include a ground structure for effective protection against static electricity introduced from the outside. According to an embodiment, the color filter 420 may include a BM layer 421 made of a low-resistance material and disposed on the rear face. According to an embodiment, the BM layer 421 may include a low-resistance resin applied to the rear face of the color filter 420. According to an embodiment, the low-resistance resin is configured to have a resistance range of 104 to 107 ohms (Ω) such that the common electrodes 411 are capable of smoothly recognizing the touch of an external object (e.g., a user's finger), so that static electricity can be smoothly collected. According to an embodiment, the BM layer 421 may be disposed to have at least the same region as the region of the color filter 420. According to an embodiment, one end of the BM layer 421 may be disposed so as to have a side face exposed to the outside of the sealant 415 and coinciding with the region of the color filter 420. According to an embodiment, the side end portion of the BM layer 421 exposed to the outside and the substrate 410 may be electrically connected by a conductive connection member 460. According to an embodiment, the conductive connection member 460 may electrically connect the side end portion of the BM layer 421 and the ground of the substrate 410. According to an embodiment, the conductive connection member 460 may include Ag paste. However, the disclosure is not limited to this, and the side end portion of the BM layer 421 may be electrically connected to the ground of the substrate 410 through various processes such as soldering. According to an embodiment, the adhesive member 431 for attaching the upper polarizing plate 430 to the color filter 420 is formed of a low-resistance adhesive member, and may be electrically connected to the ground of the substrate 410 together with the low-resistance BM layer 421 by the conductive connection member 460. According to an embodiment, the low-resistance adhesive member 41 may be formed of a material having a resistance value of 107 to 109 ohms (Ω).

According to various embodiments, when static electricity is introduced from the outside of the electronic device, the static electricity may be collected in the BM layer formed of the low-resistance material and may be discharged to the ground of the substrate through the conductive connection member.

Figure 5:
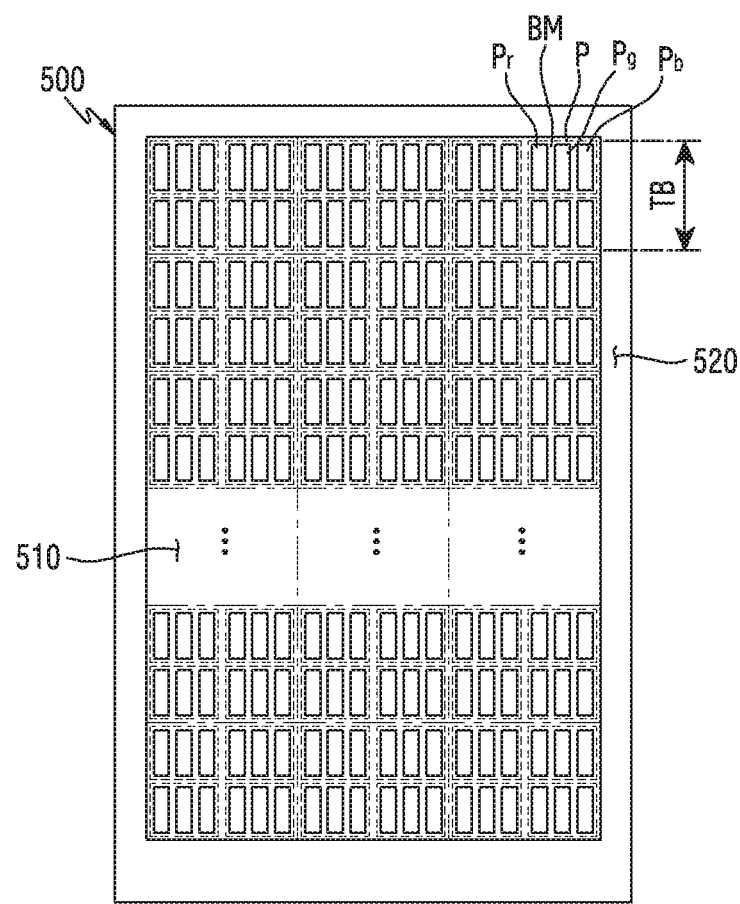
FIG. 5 is a view illustrating the configuration of a black matrix (BM) region of a touch display according to various embodiments of the disclosure.

FIG. 5 is a view illustrating the configuration of a black matrix (BM) layer of a touch display according to various embodiments of the disclosure.

The BM layer 500 in FIG. 5A may be similar to the BM layer 421 in FIG. 4, or may include another embodiment of the BM layer.

Referring to FIG. 5, the BM layer 500 may include an active region 510 and a non-active region 520 formed along the peripheral edges of the active region 510 to have a predetermined width from the edges, with reference to the display. According to an embodiment, the active region 510 may have a plurality of pixels P arranged at predetermined intervals. Each pixel P included in the plurality of pixels includes a first sub-pixel region Pr that emits light of a first color, a second sub-pixel region Pr that emits light of a second color different from the first color, and a third sub-pixel region Pb that emits light of a third color different from the first color and the second color, in which the first to third sub-pixel regions are sequentially arranged in a predetermined direction.

According to various embodiments, the plurality of pixels P may be arranged in a matrix form partitioned by BM regions on the BM layer 500 disposed on the rear face of a color filter (e.g., the color filter 420 in FIG. 4), and a predetermined number may be arranged depending on resolution.

According to various embodiments, each of the first to third sub-pixel regions Pr, Pg, and Pb may include filters of first to third colors, which are different from each other. According to an embodiment, the first to third colors may include, for example, red (R), green (G), and blue (B), respectively. However, the disclosure is not limited to this, and any combination is possible as long as the first to third colors is capable of realizing white light by combination.

According to various embodiments, a touch block TB may be disposed by blocking some of a plurality of pixels. According to an embodiment, the active region 510 may be divided by a plurality of touch blocks TB, and a common electrode (e.g., the common electrode 411 in FIG. 4) may be disposed in a region of the substrate (the substrate 410 in FIG. 4), which corresponds to each touch block TB. According to an embodiment, the common electrodes 411 separated by the above-described touch blocks TB may be used as touch wiring that senses a load change of a capacitance that changes at the time of touch and transmits the load change to a sensing circuit.

Figure 6:
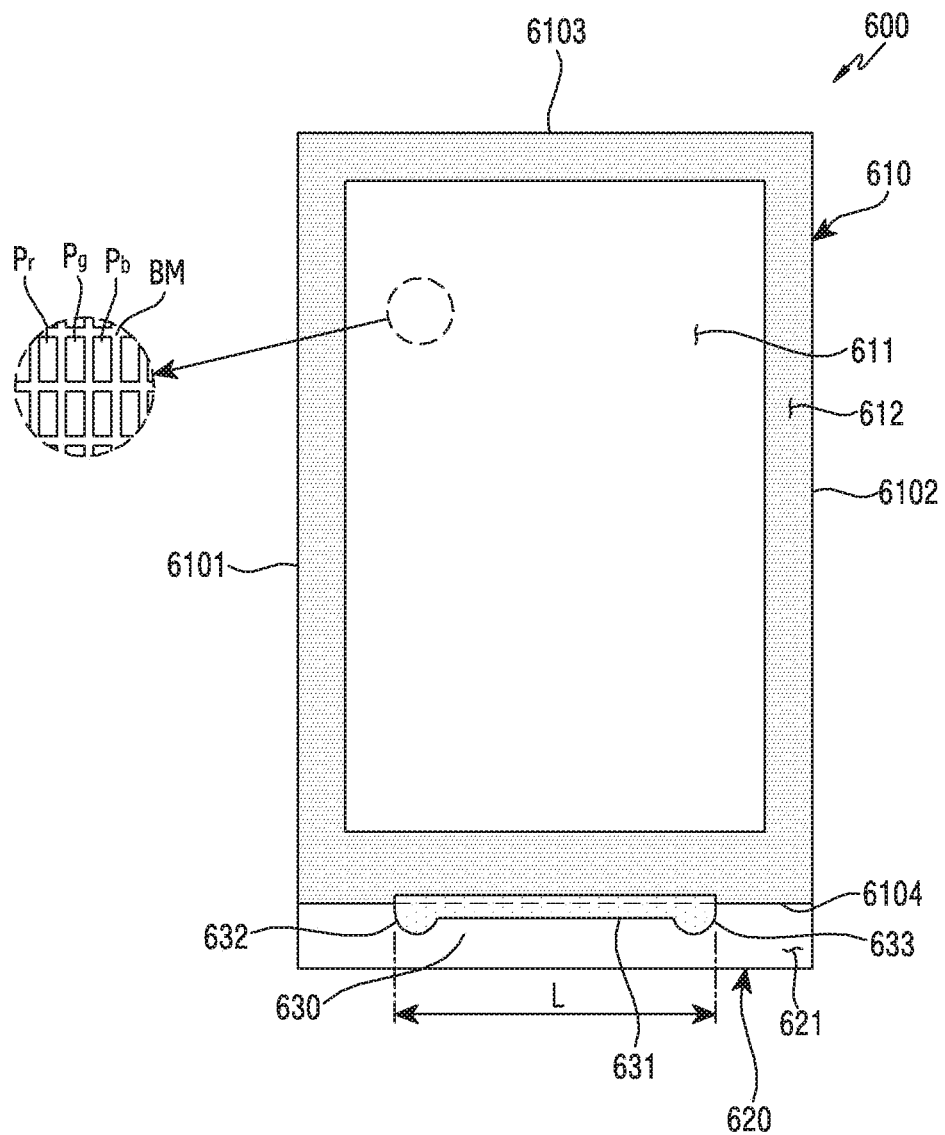
FIG. 6 is a view illustrating the state in which a part of a BM region of a touch display is grounded by a conductive connection member according to various embodiments of the disclosure.

FIG. 6 is a view illustrating the state in which a part of a BM region of a touch display is grounded by a conductive connection member according to various embodiments of the disclosure.

The electronic device 600 of FIG. 6 may be similar to the display 301 of FIG. 3 or the touch display 400 of FIG. 4, or may include another embodiment of the touch display.

Referring to FIG. 6, the touch display 600 may include a substrate 620 and a color filter (not illustrated) disposed in a manner of being stacked above the substrate 620. According to an embodiment, a BM layer 610, which is disposed on the rear face of the color filter and at least partially electrically connected to the ground of the substrate 620, is illustrated for convenience of description.

According to various embodiments, the BM layer 610 may include an active region 611 and a non-active region 612 with reference to the display. According to an embodiment, in the active region 611, a plurality of pixels, each of which includes first, second, and third sub-pixel regions Pr, Pg, and Pb, are partitioned by BM regions, as described above. According to an embodiment, the BM layer 610 may include a first side face 6101, a second side face 6102 disposed at a position opposite the first side face 6101, a third side face 6103 connecting one end of the first side face 6101 and one end of the second side face 6102 to each other, and a fourth side surface 6104 connecting the other end of the first side face 6101 and the other side face of the second side surface 6102 to each other. According to an embodiment, the BM layer 610 may be formed to have substantially the same region as the substrate 620. According to an embodiment, at least some of the side faces (e.g., the fourth side face) of the BM layer 610 may be disposed inside the substrate 620.

According to various embodiments, the BM layer 610 may be formed of a low-resistance material (e.g., a low-resistance resin having a resistance value in a predetermined range) and may be electrically connected to the ground of the substrate 620 by a conductive connection member 630 (e.g., Ag paste). According to an embodiment, the conductive connection member 630 may be disposed along the edge of the fourth side face 6104 so as to overlap a part of the region 621 of the substrate 620 and the fourth side face 6104 of the BM layer 610. According to an embodiment, the conductive connection member 630 may be formed to have a length L, and may be formed to have a larger contact area at the ends 632 and 633 thereof than the intermediate portion 631 thereof. According to an embodiment, the conductive connection member 630 has a predetermined contact length L, thereby providing a more sufficient contact amount than a dot-type contact, so that static electricity collected from the BM layer 610 can be evenly guided to the ground of the substrate 620 without being weighted.

Figure 7:
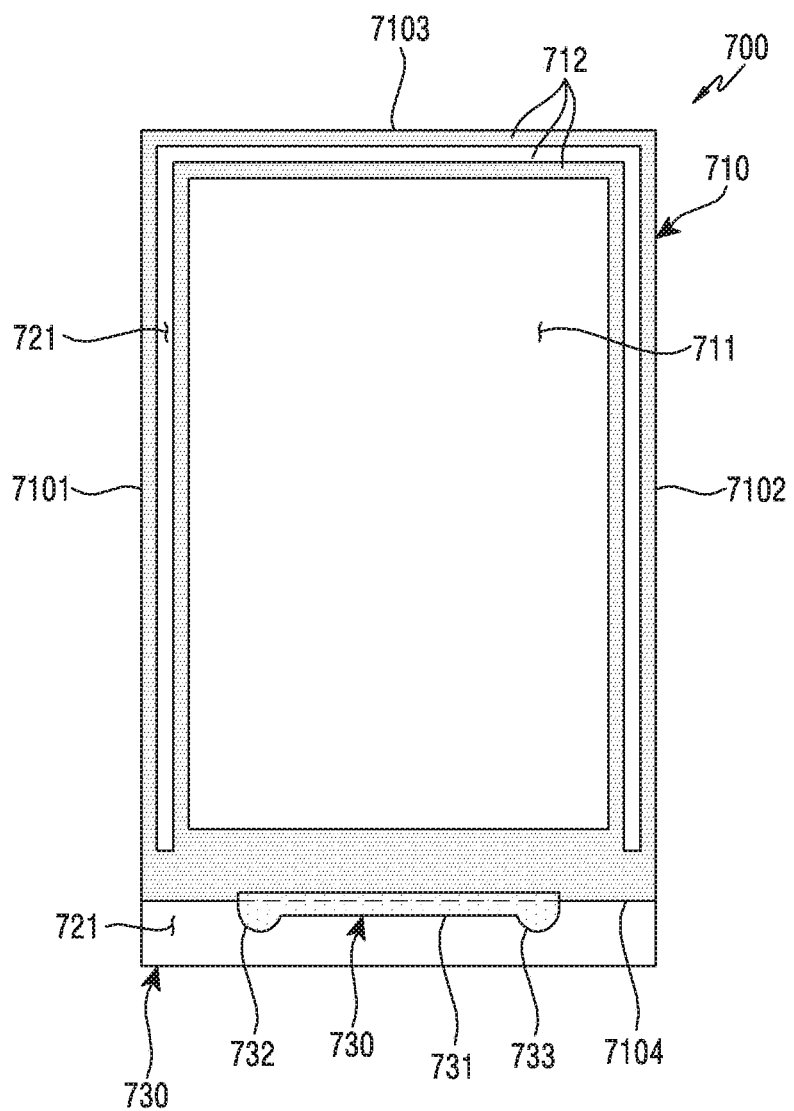
FIG. 7 is a view illustrating the state in which a part of a BM region of a touch display is grounded by a conductive connection member according to various embodiments of the disclosure.

FIG. 7 is a view illustrating the state in which a part of a BM region of a touch display is grounded by a conductive connection member according to various embodiments of the disclosure.

The touch display 700 of FIG. 7 may be similar to the display 301 of FIG. 3 or the touch display 400 of FIG. 4, or may include another embodiment of the touch display.

Referring to FIG. 7, the touch display 700 may include a substrate 720 and a color filter (not illustrated) disposed in a manner of being stacked above the substrate 720. According to an embodiment, a BM layer 710, which is disposed on the rear face of the color filter and at least partially electrically connected to the ground of the substrate 720, is illustrated for convenience of description.

According to various embodiments, the BM layer 710 may include an active region 711 and a non-active region 712 with reference to the display. According to an embodiment, in the active region 711, a plurality of pixels, each of which includes first, second, and third sub-pixel regions (e.g., the first to third sub-pixel regions Pr, Pg, and Pb in FIG. 6), are partitioned by BM regions. According to an embodiment, the BM layer 710 may include a first side face 7101, a second side face 7102 disposed at a position opposite the first side face 7101, a third side face 7103 connecting one end of the first side face 7101 and one end of the second side face 7102 to each other, and a fourth side surface 7104 connecting the other end of the first side face 7101 and the other side face of the second side surface 7102 to each other. According to an embodiment, the BM layer 710 may be formed to have substantially the same region as the substrate 720. According to an embodiment, at least some of the side faces (e.g., the fourth side face) of the BM layer 710 may be disposed inside the substrate 720.

According to various embodiments, the BM layer 710 may be formed of a low-resistance material (e.g., a low-resistance resin having a resistance value in a predetermined range) and may be electrically connected to the ground of the substrate 720 by a conductive connection member 730 (e.g., Ag paste). According to an embodiment, the conductive connection member 730 may be disposed to overlap a part of the region 721 of the substrate 720 and the fourth side face 7104 of the BM layer 710 along the edge of the fourth side face 7104 of the BM layer 710 formed to have less area than the substrate 720. According to an embodiment, the conductive connection member 730 may be formed to have a predetermined length, and may be formed to have a larger contact area at the ends 732 and 733 thereof than the intermediate portion 731 thereof. According to an embodiment, the conductive connection member 630 has a predetermined contact length, thereby providing a more sufficient contact amount than a dot-type contact, so that static electricity collected from the BM layer 710 can be evenly guided to the ground of the substrate 720 without being weighted.

According to various embodiments, the BM layer may include a slit formed along the non-active region. According to an embodiment, the slit may extend from at least a partial region of the first side face to the second side face bypassing the third side face. According to an embodiment, the electronic device is capable of effectively dispersing the static electricity that is introduced into a side face of the electronic device by the slit described above.

According to various embodiments, in the embodiments described above, the electrical connection member 630 or 730 may be disposed to include a part of the region 621 or 721 where the substrate 620 or 720 and the BM layer 610 or 710 do not overlap, and a part of the fourth side face 6104 or 7104 of the BM layer 610 or 710, but the disclosure is not limited thereto. For example, the conductive connection member 630 or 730 may be disposed in at least one of various region that may include exposed portions of the substrate 620 or 720 and the BM layer 610 or 710.

According to various embodiments, an electronic device may include a touch display, and the touch display may include: a substrate; a plurality of common electrodes disposed on the substrate at predetermined intervals and used for arrangement of liquid crystals and for touch wiring; a liquid crystal layer disposed above the common electrodes; and a color filter disposed above the liquid layer and including a plurality of unit pixels arranged at predetermined intervals via a low-resistance black matrix (BM) layer disposed on a rear face. The BM layer may be formed of a low-resistance material, and at least a partial region of the BM layer is electrically connected to a ground of the substrate.

According to various embodiments, the BM layer may include a low-resistance resin, and the low-resistance resin may be configured to have a resistance range of 104 to 107 ohms ($\Omega$).

According to various embodiments, the electronic device may further include a polarizing plate stacked above the color filter via an adhesive member, and the adhesive member may be formed of a low-resistance resin material having a resistance value in a range of 107 to 109 ohms ($\Omega$).

According to various embodiments, at least a partial region of the adhesive member may be electrically connected to the ground of the substrate together with the BM layer.

According to various embodiments, the touch display may include a conductive connection member connecting at least a partial region of the BM layer and the ground of the substrate to each other.

According to various embodiments, at least one side face of the BM layer may be exposed and extended so as to at least conform to a side face of the color filter, and the conductive connection member may be disposed in the manner of including both a region of the exposed BM layer and a ground region of the substrate.

According to various embodiments, the conductive connection member may be disposed to have a predetermined length in at least one portion along at least one side face of the BM layer so as to have a contact amount by a length corresponding to the ground region of the substrate.

According to various embodiments, the conductive connection member may be disposed such that a contact amount in each of opposite ends thereof is larger than a contact amount in an intermediate portion thereof.

According to various embodiments, the electric connection member may include AG paste.

According to various embodiments, a partial region of the BM layer may be exposed to an outside of a sealant disposed in order to interrupt liquid crystal held between the color filter and the substrate, and the exposed region of the BM layer may be electrically connected to the ground of the substrate.

According to various embodiments, the BM layer may include an active region of the display and a non-active region extending to have a predetermined width along a peripheral edge of the active region, and at least a partial region of the non-active region may be electrically connected to the ground of the substrate.

According to various embodiments, the non-active region of the BM layer may include a slit extending in a longitudinal direction.

According to various embodiments, the substrate may include a TFT.

According to various embodiments, an electronic device may include, a housing including a first face oriented in a first direction and a second face oriented in a second direction opposite the first direction; a window on at least a part of the first face of the housing; and a touch display disposed between the window and the second face. The touch display may include a substrate, a plurality of common electrodes disposed on the substrate at predetermined intervals and used for arrangement of liquid crystals and for touch wiring, a liquid crystal layer disposed above the common electrodes, a color filter disposed above the liquid crystal layer and including a plurality of unit pixels arranged at predetermined intervals by a low-resistance black matrix (BM) layer disposed on a rear face, a polarizing plate stacked above the color filter via a low-resistance adhesive member, and a conductive connection member disposed to electrically connect at least a partial region of the BM layer and at least a partial region of the low-resistance adhesive member to the ground of the substrate.

According to various embodiments, at least one side face of the BM layer may be exposed and extended so as to at least conform to a side face of the color filter, the adhesive member may be exposed and extended so as to at least conform to a side face of the polarizing plate, and the conductive connection member may be disposed in the manner of including all the region of the exposed BM layer, the exposed region of the adhesive member, and the ground region of the substrate.

The embodiments of the disclosure disclosed in the specification and the drawings are only particular examples proposed in order to easily describe the technical matters of the disclosure and help with comprehension of the disclosure, and do not limit the scope of the disclosure. Therefore, in addition to the embodiments disclosed herein, the scope of the various embodiments of the disclosure should be construed to include all modifications or modified forms drawn based on the technical idea of the various embodiments of the disclosure.

The invention claimed is:

1. An electronic device comprising:
   a touch display,
   wherein the touch display comprises:
      a substrate,
      a plurality of common electrodes disposed on the substrate at predetermined intervals and used for arrangement of liquid crystals and for touch wiring,
      a liquid crystal layer disposed above the common electrodes,
      a color filter disposed above the liquid crystal layer and including a plurality of unit pixels arranged at predetermined intervals by a black matrix (BM) layer disposed on the color filter, wherein the BM layer includes a first edge having a first length and a second edge, perpendicular to the first edge, having a second length longer than the first edge, and
      a conductive connection member contacted along the first edge of four edges of the BM layer,
   wherein the BM layer is formed of a low-resistance material, and at least a partial region of the BM layer is electrically connected to a ground of the substrate via the conductive connection member,
   wherein the conductive connection member has a length longer than half of a length of the first edge and shorter than the length of the first edge contacted with the conductive connection member, and
   wherein the conductive connection member covers at least a portion of each of the substrate, the color filter and the BM layer.

2. The electronic device of claim 1, wherein the BM layer includes a low-resistance resin.

3. The electronic device of claim 2, wherein the low-resistance resin is configured to have a resistance range of $10^4$ to $10^7$ ohms ($\Omega$).

4. The electronic device of claim 1, further comprising:
   a polarizing plate stacked above the color filter via an adhesive member.

5. The electronic device of claim 4, wherein the adhesive member is formed of a low-resistance material having a resistance value in a range of $10^7$ to $10^9$ ohms ($\Omega$).

6. The electronic device of claim 5, wherein at least a partial region of the adhesive member is electrically connected to the ground of the substrate together with the BM layer.

7. The electronic device of claim 1, wherein the conductive connection member connects at least a partial region of the BM layer and the ground of the substrate to each other.

8. The electronic device of claim 7,
   wherein at least one side face of the BM layer is exposed and extended so as to at least conform to a side face of the color filter, and
   wherein the conductive connection member is disposed in a manner of including both a region of the exposed BM layer and a ground region of the substrate.

9. The electronic device of claim 8, wherein the conductive connection member is disposed to have a designated length in at least one portion along at least one side face of the BM layer so as to have a contact amount by a length corresponding to the ground region of the substrate.

10. The electronic device of claim 9, wherein the conductive connection member is disposed such that a contact amount in each of opposite ends thereof is larger than a contact amount in an intermediate portion thereof.

11. The electronic device of claim 7, wherein the conductive connection member includes AG paste.

12. The electronic device of claim 1,
wherein a partial region of the BM layer is exposed to an outside of a sealant disposed in order to interrupt liquid crystal held between the color filter and the substrate, and
wherein the exposed region of the BM layer is electrically connected to the ground of the substrate.

13. The electronic device of claim 1,
wherein the BM layer includes an active region of the display and a non-active region extending to have a predetermined width along a peripheral edge of the active region, and
wherein at least a partial region of the non-active region is electrically connected to the ground of the substrate.

14. The electronic device of claim 13, wherein the non-active region of the BM layer includes a slit extending in a longitudinal direction.

15. The electronic device of claim 1, wherein the substrate includes a TFT.

16. An electronic device comprises:
a housing including a first face oriented in a first direction and a second face oriented in a second direction opposite the first direction; and
a window on at least a part of the first face of the housing; and a touch display disposed between the window and the second face,
wherein the touch display includes:
a substrate,
a plurality of common electrodes disposed on the substrate at predetermined intervals and used for arrangement of liquid crystals and for touch wiring,
a liquid crystal layer disposed above the common electrodes,
a color filter disposed above the liquid crystal layer and including a plurality of unit pixels arranged at predetermined intervals by a low-resistance black matrix (BM) layer disposed on the color filter, wherein the BM layer includes a first edge having a first length and a second edge, perpendicular to the first edge, having a second length longer than the first edge,
a polarizing plate stacked above the color filter via a low-resistance adhesive member, and
a conductive connection member contacted along the first edge of four edges of the BM layer and disposed to electrically connect at least a partial region of the BM layer and at least a partial region of the low-resistance adhesive member to the ground of the substrate,
wherein the conductive connection member has a length longer than half of a length of the first edge and shorter than the length of the first edge contacted with the conductive connection member, and
wherein the conductive connection member covers at least a portion of each of substrate, the color filter, and the BM layer.

17. The electronic device of claim 16,
wherein a partial region of the BM layer is exposed to an outside of a sealant disposed in order to interrupt liquid crystal held between the color filter and the substrate, and
wherein the exposed region of the BM layer is electrically connected to the ground of the substrate.

18. The electronic device of claim 16,
wherein at least one side face of the BM layer is exposed and extended so as to at least conform to a side face of the color filter,
wherein the adhesive member is exposed and extended so as to at least conform to a side face of the polarizing plate, and
wherein the conductive connection member is disposed in a manner of including all the region of the exposed BM layer, the exposed region of the adhesive member, and a ground region of the substrate.

19. The electronic device of claim 18, wherein the conductive connection member is disposed to have a designated length in at least one portion along at least one side face of the BM layer so as to have a contact amount by a length corresponding to the ground region of the substrate.

20. The electronic device of claim 16, wherein the low-resistance BM layer has a resistance range of $10^4$ to $10^7$ ohms.

* * * * *